July 31, 1928.
M. H. SUSSMAN
1,678,963
MECHANISM FOR REMOVING BURRS FROM TUBES
Filed Aug. 12, 1927   3 Sheets-Sheet 3
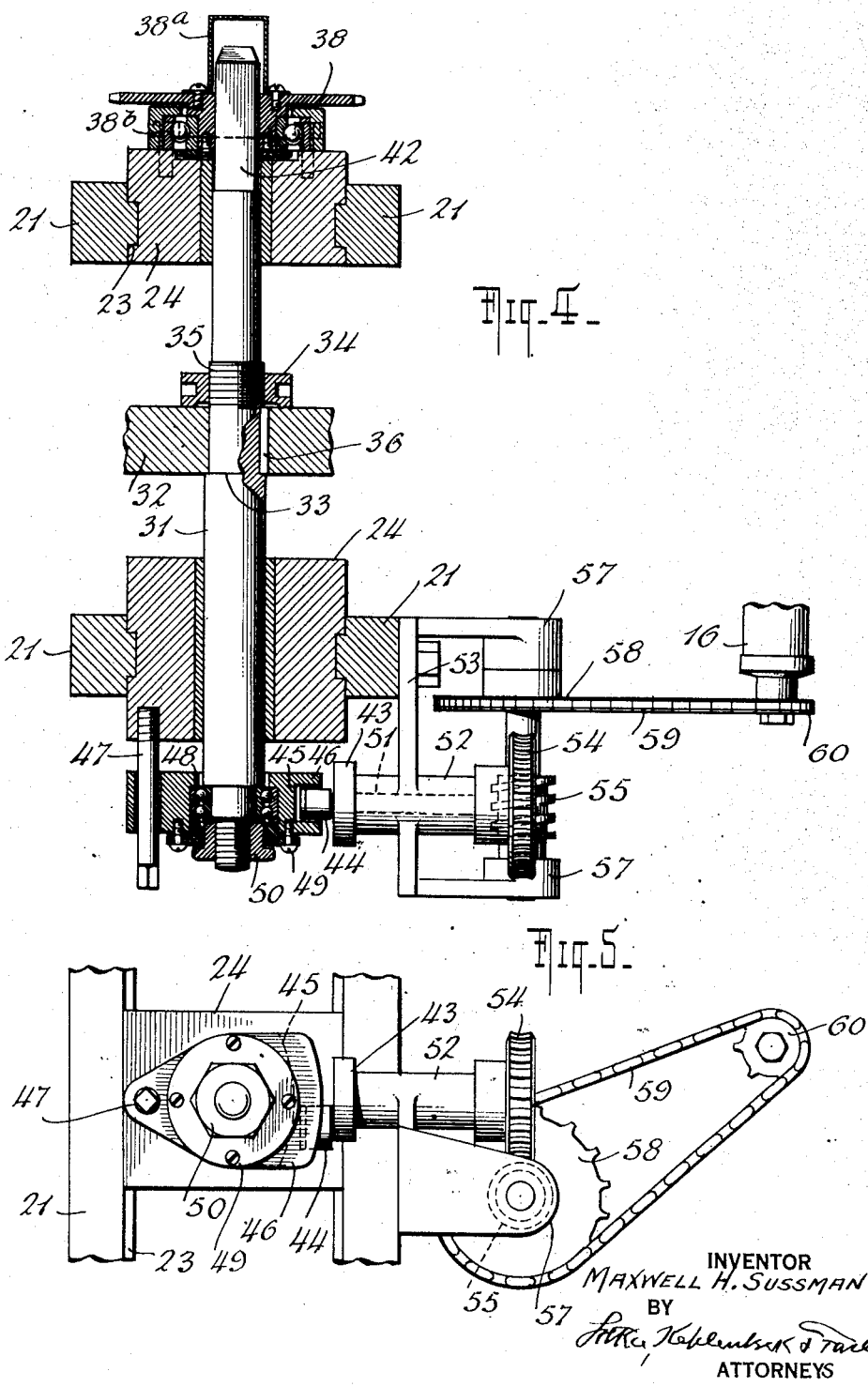
INVENTOR
MAXWELL H. SUSSMAN
BY
ATTORNEYS

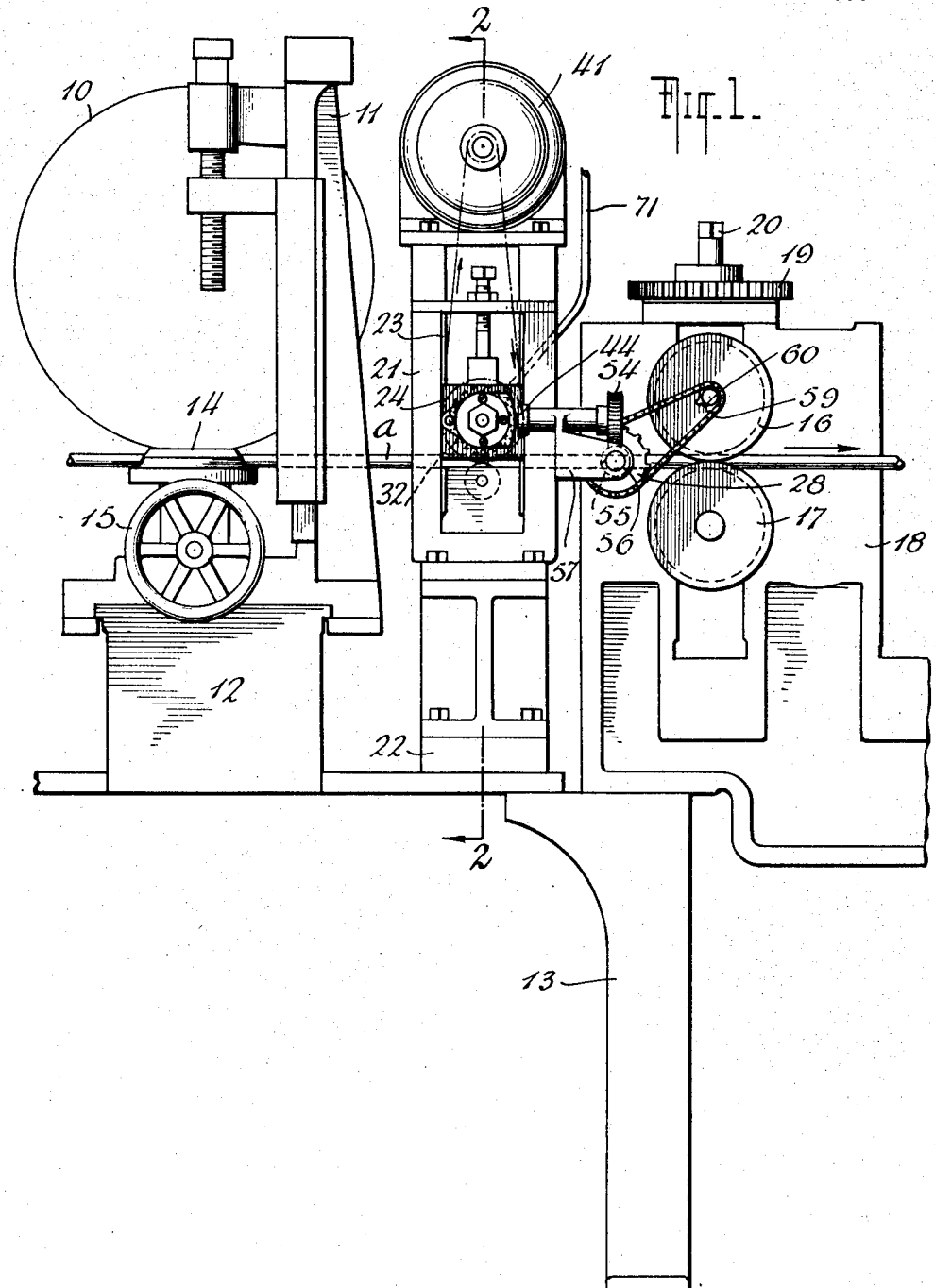

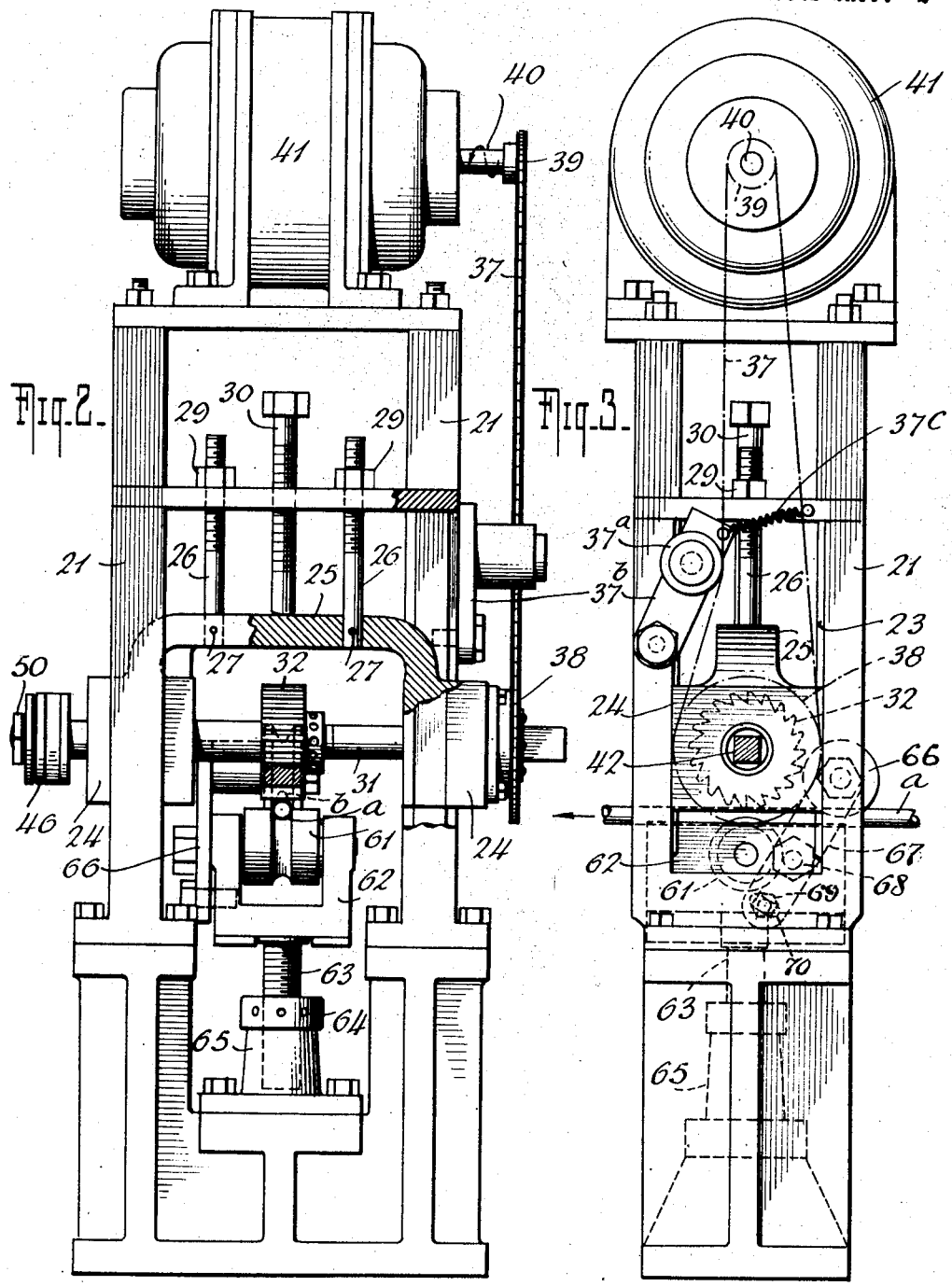

Patented July 31, 1928.

1,678,963

UNITED STATES PATENT OFFICE.

MAXWELL H. SUSSMAN, OF KEW GARDENS, NEW YORK, ASSIGNOR TO THE ELYRIA IRON AND STEEL COMPANY, OF CLEVELAND, OHIO, A CORPORATION OF OHIO.

MECHANISM FOR REMOVING BURRS FROM TUBES.

Application filed August 12, 1927. Serial No. 212,541.

The invention relates to the art of making welded steel tubing, more particularly of the type used in the construction of metal furniture, standards for lamps, automobile valve rods, and similar articles. Generally speaking tubes of the indicated class are electrically or gas welded along the seam, during the process of production, the hot, soft metal being pressed at said seam at the instant of welding. This operation results in the formation of a burr lengthwise of and at said seam which is required to be removed in order to give to the tube the desired finished appearance. The problem of removing such burrs has been a difficulty which has been met in some instances by a separate grinding operation performed by means of a grinding wheel, emory belt or equivalent means or by rolling down over a mandrel. The efficient solution of the problem becomes particularly difficult when it comes to tubes of relatively small diameter, as for instance tubes having diameters below seven eighths of an inch; with tubes of such small diameters it is not practicable to utilize the methods which have been found satisfactory with respect to tubes of larger diameters than those indicated. It has heretofore been attempted to avoid the existing difficulties by first producing the tubes in larger diameters capable of being treated according to present methods and then by drawing and annealing, reducing said larger tubes to the desired smaller dimensions; this process is both slow and expensive. The present invention has for its object the provision of a novel and simple machine whereby the outer burr may be efficiently and economically removed from the tubes immediately following the welding operation, and more particularly contemplates a machine adapted especially for operating on tubes of reduced diameters. Other objects will appear from the description hereinafter and the features of novelty will be pointed out in the claims.

In the accompanying drawings, which show an example of the invention without defining its limits, Fig. 1 is a side elevation of a tubing machine embodying the novel features; Fig. 2 is a sectional elevation taken approximately on the line 2—2 of Fig. 1; Fig. 3 is a side elevation of the burr removing mechanism; Fig. 4 is an enlarged detail horizontal section illustrating the cutter-shaft arrangement thereof, and Fig. 5 is a horizontal front view thereof.

In the illustrated example the burr removing mechanism is combined with the welding unit of a conventional tube making machine in which the customary welding electrode 10 is adjustably mounted in any conventional manner upon the standard 11 which projects upwardly from the base 12; the latter is supported upon or comprises part of the usual supporting frame 13. The customary side pressure rolls 14 are adjustably mounted upon the base 12 and are controlled by the hand wheel 15 in the well known way. The tube making machine of the illustrated example further includes finishing rolls 16 and 17 mounted as usual in a supporting frame 18, the upper roll 16 as usual, being adjustable by means of gearing 19 and an adjusting screw 20. The finishing rolls 16 and 17 are driven in any convenient way, usually by suitably applying power to both rolls to finish the tube $a$ after the burr has been removed therefrom in the manner to be explained hereinafter. All of the parts so far described may be of any well known type and arrangement and form no part of the invention.

The burr removing mechanism, in the form illustrated in the drawings, is located between the welding unit and the finishing unit of the tube making machine, preferably as close as possible to the former, and comprises an upright sub-frame 21 projecting upwardly from a base 22 carried by the supporting frame 13, as shown in Fig. 1. The upright frame 21 is provided with spaced, parallel guides 23 arranged in opposite pairs for slidably accommodating bearing blocks 24 which are connected by a cross-web 25 in the form of a bearing-unit capable of being adjusted vertically for the purpose to be more fully set forth hereinafter. The cross-web 25 is suspended by means of screw-threaded rods 26 secured thereto at 27 and passing loosely through a cross-bar 28 rigidly supported upon the frame 21 as shown in Figs. 2 and 3; the screwthreaded ends of the rods 26 receive nuts 29 which bear against the cross-bar 28 and constitute the means whereby the cross-web 25 and with it the bearing blocks 24 are raised and lowered along the guides 23. To fix the web 25 and blocks 24 against undesirable vibration in an adjusted position a bolt 30 passes through the cross-bar 28 in screwthreaded engagement therewith and bears with its end against the web 25 as illustrated in Fig. 2. The bearing blocks 24 constitute journals for a cutter shaft 31 on which a milling cutter 32 is mounted, the latter being suitably and removably fixed on said shaft 31 in any convenient manner, as for instance by being clamped between an annular shoulder 33 of the shaft 31 and a nut 34 screwed upon a threaded portion 35 with which said shaft is provided; to positively fasten the cutter 32 on the shaft 31 against independent, relative rotation a key 36 projecting into co-operating keyways is provided as shown in Fig. 4. The cutter shaft 31 is rotated to operate the cutter 32, by means of a sprocket chain 37 and sprocket wheels 38 and 39, the latter being secured upon the shaft 40 of an electric motor 41, which, as illustrated in Figs. 1, 2 and 3, is mounted upon the subframe 21. The sprocket wheel 38 is rotatably mounted upon one of the bearing blocks 24 by means of a ball bearing 38$^a$, and is fixed on said block against movement in axial directions. A take-up roll 37$^a$ carried by a pivoted member 37$^b$ which is acted upon by a spring 37$^c$ may be provided for automatically taking up slack in the chain 37. In order to distribute the wear over all parts of the cutting periphery of the cutter 32 to thereby prolong the active life thereof, the cutter shaft 31, in addition to being rotatable in the blocks 24, is slidable therein in the direction of its length and relatively to the sprocket wheel 38. For this purpose, and in order to at all times maintain an operative connection between said sprocket wheel 38 and the shaft 31, the latter is formed with a squared or otherwise polygonal continuation 42 which slidably fits a correspondingly shaped axial opening in said sprocket wheel 38. To protect the connection between the end 42 of the shaft 31 and the sprocket wheel 38 against the effects of dust and other foreign matter, a dust cap 38$^a$ is secured to the sprocket wheel 38 to cover the aforesaid continuation 42 of the shaft 31 as shown in Fig. 4. The means whereby the shaft 31 is moved in axial directions to correspondingly shift the cutter 32 relatively to the work comprises a rotatable disk 43 on which a bushing 44 is eccentrically mounted to function in the nature of a crank. The bushing 44 projects into the curved groove 45 of a member 46 which is fixed against rotation by and is slidable on a guide pin 47 projecting outwardly from one of the blocks 24 as shown in Fig. 4. The member 46 surrounds the shaft 31 which is journalled therein preferably in a ball bearing 48, said member 46 being arranged to impart lengthwise reciprocating movements to said shaft 31 for instance through the medium of a flanged washer 49 and a nut 50, the latter being threaded upon the shaft 31 as shown in Fig. 4. The disk 43 is fixed upon a vertical worm shaft 51 journalled in a bearing 52 forming part of an auxiliary frame 53 mounted upon the sub-frame 21, said worm shaft 51 carrying a worm gear 54 in mesh with a worm 55 secured upon a drive shaft 56. The latter is rotatable in bearings 57 forming part of said auxiliary frame 53 and is provided with a sprocket wheel 58 connected by means of a sprocket chain 59 with a sprocket pinion 60 fastened upon the shaft of the upper finishing roll 16 and receiving power therefrom.

In order to maintain the tube $a$ against vibration and twisting and to provide for proper adjustment thereof against the cutter 32, a grooved supporting roll 61 is located below said cutter 32 and is journalled in a forked bearing 62 carried by a screw-threaded stem 63; the latter is vertically movable in a standard 65 fixed upon the base of the machine and is held against rotation about its axis in any suitable manner as by means of a keyway and key. A notched nut 64 is rotatably mounted upon the standard 65 and is maintained in position in any convenient manner as by means of a pawl and spring engaging said notches. With this arrangement the roll 61 may be raised and lowered by turning the nut 64, to properly support the tube $a$ in operative relation to the cutter 32 in a manner to prevent vibration and twisting of said tube whereby the proper removal of the burr might be interfered with. In addition to the supporting roll 61, there is provided a grooved auxiliary roll 66 arranged to engage the tube $a$ from above, said roll 66 being journalled on a stud secured to a link 67. The latter is pivoted at 68 for raising and lowering the roll 66 and is fixed in an adjusted position by means of a bolt 69 which passes through a curved slot 70 in the link 67 as shown in Fig. 3.

To neutralize the heat developed in the tube $a$ during the welding thereof, and in the cutter 32 during the removal thereby of the burr, provision is made to cool the cutter 32. This may be done by providing a pipe 71 through which oil or other cooling fluid is directed against the cutter as indicated diagrammatically in Fig. 1.

In practice the tube $a$ after having been shaped to the determined cross sectional form usually round is passed in operative relation to the welding electrode 10 whereby the seam of the previously formed tube is welded to thereby complete the structure of said tube. This welding operation creates a substantial burr $b$ along the seam, the height of said burr depending upon the amount of heat and pressure imparted to the tube $a$; it is necessary to remove this burr $b$ from the outer surface of said tube to impart the desired finished appearance thereto. To accomplish this purpose the tube subsequently to the welding operation continues its travel in a lengthwise direction, and in the heated condition developed therein by the welding operation finally passes in tangential relation to the milling cutter 32, the latter being rotated through the medium of the motor 41 and the sprocket wheels 38 and 39 and sprocket chain 37 in a direction opposite to the direction of travel of the tube $a$. The supporting roller 61 and auxiliary roll 66 having previously been adjusted to properly position the tube $a$ with respect to said cutter the latter will operate to cut away the burr $b$ and to thereby leave the tube $a$ in a condition ready to be acted upon the finishing rolls 16 and 17 and any other following rolls to which said tube passes subsequently to the removal of the burr $b$. As the aforesaid operations take place the sprocket wheels 58 and 60 and the sprocket chain 59 will rotate the shaft 56 and thereby through the medium of the worm 55 and worm gear 56 will rotatably actuate the shaft 51 and the disk 43. The bushing 44 is thereby caused to describe the circular path about the axis of the shaft 51 in the nature of a crank whereby the member 46 is moved to and fro along the guide stud 47. This to and fro movement of the member 46 is transmitted to the shaft 31 and imparts to the latter a slow reciprocatory movement in the direction of its axis. This operation of the shaft 31 accordingly reciprocates the cutter 32 transversely of the tube $a$ and accordingly brings all parts of the cutting periphery of said cutter into active use for cutting away the burr $b$. This reciprocatory motion of the cutter maintains the cutting edge for a long time, as the hot metal tends to eat it away rapidly otherwise. As the shaft 31 moves back and forth in the manner set forth, the squared continuation 42 will slide relatively to the sprocket wheel 38 in the axial opening thereof without effecting the operative connection between said shaft and said sprocket wheel.

The machine is simple in construction and reliable in operation and provides an efficient solution to the problem of removing burrs high or low from metal tubes of all sizes, and particularly solves the problem of removing the burr from such tubes of relatively small diameters.

Various changes in the specific forms shown and described may be made from the scope of the claims without departing from the spirit of the invention.

I claim:

1. In a machine for removing burrs from tubes, the combination of means for supporting a travelling tube having an external burr extending lengthwise thereof, bearings located in spaced axial alignment with each other, a sprocket-wheel rotatably mounted on one of said bearings and fixed thereon against movement in axial directions, said sprocket-wheel being connected with a source of power, a cutter-shaft journalled in said bearings and axially slidable therein relatively to said sprocket-wheel, means whereby said sprocket-wheel and cutter-shaft are connected to move in unison without interference with the axial slidability of said shaft, a cutter-wheel carried by said shaft for cutting away said burr, a guide-pin projecting from one of said bearings, a grooved member slidably mounted on said guide-pin and connected with said shaft, a crank-disk having a bushing projecting into the groove of said member, and mechanism for rotating said disk whereby said member and shaft are reciprocated in the direction of the axis of said shaft and said cutter is reciprocated transversely of the path of travel of said tube simultaneously with the rotation of said cutter.

2. In a machine for removing burrs from metal tubes, the combination of means for supporting a travelling tube having an external burr extending lengthwise thereof, a frame provided with vertical guides, bearing blocks vertically adjustable on said guides, a cross-web connecting said blocks in the form of a bearing unit, means for vertically adjusting said bearing unit, means for fixing said bearing unit in an adjusted position against vibration, a sprocket-wheel journalled on one of said bearing blocks and fixed thereon against movement in axial directions, said sprocket being connected with a source of power, a cutter-shaft journalled in said bearing blocks and axially slidable therein relatively to said sprocket-wheel, means whereby said sprocket-wheel and cutter-shaft are connected to move in unison without interference with the axial slidability of said shaft, a cutter-wheel carried by said shaft for cutting away said burr, a guide-pin projecting from one of said bearings, a grooved member slidably mounted on said guide-pin and connected with said shaft, a crank-disk having a bushing projecting into the groove of said member, and mechanism for rotating said disk whereby said member and shaft are reciprocated in the direction of the axis of said shaft and said cutter is reciprocated transversely of the path of travel of said tube simultaneously with the rotation of said cutter.

3. In a machine for removing burrs from metal tubes, the combination of means for supporting a travelling tube having an external burr extending lengthwise thereof, a frame provided with vertical guides, bearing blocks vertically adjustable on said guides, a cross-web connecting said blocks in the form of a bearing unit, a pair of adjusting screws connected with said cross-web and co-operating with said frame for vertically adjusting said bearing unit, a set screw on said frame bearing against said cross-web for fixing said bearing unit in an adjusted position against vibration, a sprocket-wheel journalled on one of said bearing blocks and fixed thereon against movement in axial directions, said sprocket-wheel having a rectangular axial opening and being connected with a source of power, a cutter-shaft journalled in said bearing blocks and axially slidable thereon relatively to said sprocket-wheel, said shaft having a squared extension slidably fitting the rectangular opening of said sprocket-wheel, a cutter-wheel carried by said shaft for cutting away said burr, a guide-pin projecting from one of said bearings, a grooved member slidably mounted on said guide-pin and connected with said shaft, a crank-disk having a bushing projecting into the groove of said member, and mechanism for rotating said disk whereby said member and shaft are reciprocated in the direction of the axis of said shaft and said cutter is reciprocated transversely of the path of travel of said tube simultaneously with the rotation of said cutter.

4. In a tube making machine, the combination of welding means whereby the lengthwise seam of a travelling tube is welded and an external burr is produced lengthwise of said seam, upper and lower finishing rolls located in spaced relation to said welding means, means for driving said finishing rolls, a sub-frame in said machine between said welding means and finishing rolls, a vertically adjustable grooved roller on said sub-frame for supporting said travelling tube, spaced vertical guides on said sub-frame, bearing blocks vertically adjustable on said guides, a cross-web connecting said bearing blocks in the form of a bearing unit, a pair of adjusting screws connected with said cross-web and co-operating with said sub-frame for vertically adjusting said bearing unit, a set screw on said sub-frame bearing against said cross-web for fixing said bearing unit in an adjusted position against vibration, a sprocket-wheel journalled on one of said bearing blocks and fixed thereon against movement in axial directions, said sprocket-wheel being provided with a rectangular axial opening, a motor carried by said sub-frame and having a sprocket connected with said first sprocket-wheel for driving the same, a cutter-shaft journalled in said bearing and axially slidable therein relatively to said first sprocket-wheel, said shaft having a squared extension slidably fitting the rectangular opening of said first sprocket, a cutter-wheel carried by said shaft for cutting away said burr, a guide-pin projecting from one of said bearing blocks, a grooved member slidably mounted on said guide-pin and connected with said shaft, a crank-disk having a bushing projecting into the groove of said member, worm gearing for rotating said disk whereby said member and shaft are reciprocated in the direction of the axis of said shaft and said cutter is reciprocated transversely to the path of said tube simultaneously with the rotation of said cutter, and a connection from the finishing rolls to said worm gearing whereby the latter is operated.

In testimony whereof I have hereunto set my hand.

MAXWELL H. SUSSMAN.